Feb. 10, 1931.  M. W. H. WILSON  1,791,781
MEANS FOR ASSEMBLING WIRE WHEELS
Filed Oct. 4, 1929  2 Sheets-Sheet 2
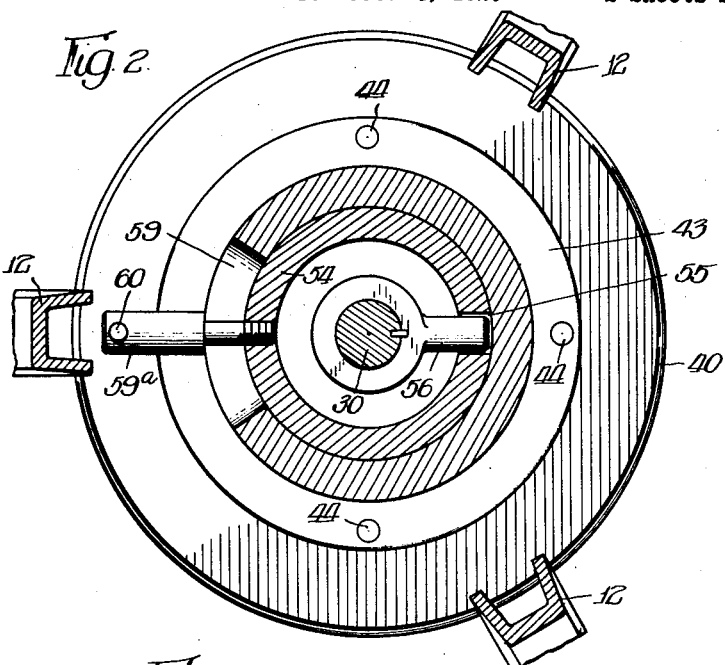
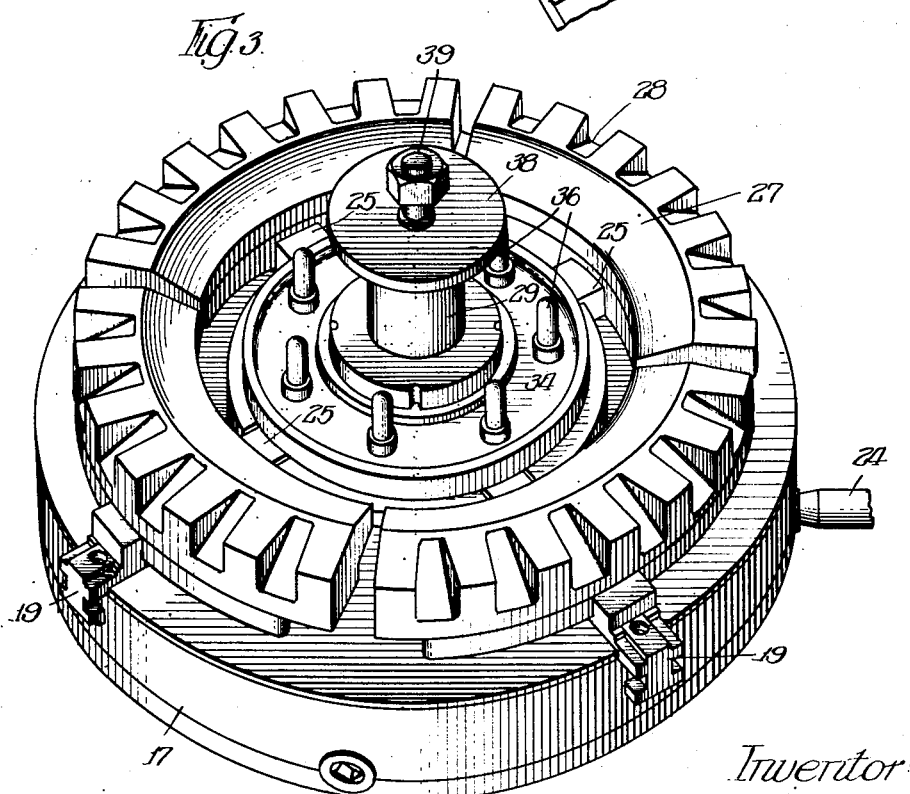
Inventor
Moses W. H. Wilson, Patented Feb. 10, 1931

1,791,781

UNITED STATES PATENT OFFICE

MOSES W. H. WILSON, OF EAST LANSING, MICHIGAN, ASSIGNOR TO MOTOR WHEEL CORPORATION, OF LANSING, MICHIGAN, A CORPORATION OF MICHIGAN

MEANS FOR ASSEMBLING WIRE WHEELS

Application filed October 4, 1929. Serial No. 397,293.

The present invention has to do with the assembling of the constituent parts of wheels, particularly wire wheels, wherein difficulty has been presented by the necessity of so lacing the wire spokes connecting the hub and the rim, that they shall be under uniform tension with the hub and rim members in exact relationship as to concentricity, angularity and as to respective planes. By "lacing" is here meant the tightening of the spokes as distinguished from the act of threading of the same in the rim and hub apertures.

Under the methods generally employed in the lacing of the wheel much depends upon the skill of the workmen using repeated tryout methods, tensioning, testing, retensioning or loosening until the parallelism of the planes, concentricity of the parts and approximate uniform tension is obtained to such degree as to satisfy the workmen and inspector. This cut and fit method is often unsatisfactory as to results and of necessity is expensive from the standpoint of labor costs.

Wheels prepared in accordance with the present invention and by use of the device disclosed herein are made in a manner such as to largely eliminate the personal equation and the excellence of the product is, to a considerable extent, independent of the experience and skill of the workmen.

According to the present method, both the front and rear sets of spokes having been threaded in the proper apertures of the hub and rim and the nipples loosely applied to the ends, the hub is moved axially to a predetermined location slightly beyond the position to be ultimately occupied by its relative to the wheel plane, and spokes connected with one end of the hub are laced to approximately uniform tension by means of a suitable tool such, for instance, as a friction screw driver or wrench. The hub member is then moved axially in relation to the rim in the opposite direction by means of a press or air cylinder to place the laced set of spokes under additional tension. The other set of spokes is then laced in a similar manner to approximately uniform tension and the pressure is removed from the hub permitting it to be drawn into the proper plane of the rim, due to the excess tension placed upon the first laced spokes. By this process the tension of the first laced set and second laced set of spokes is equalized and it has been found that the resultant wheel requires little, if any subsequent correction to attain proper alignment and equal tension.

In order that the invention may be better understood, a preferred embodiment thereof is shown in the accompanying drawings and herein described in detail. This disclosure is given for purposes of exemplification for it will be obvious to those skilled in the art upon understanding the invention and the advantages thereof that modifications may be made in the methods of procedure and in the mechanical structure herein shown without departing from the true scope and spirit of the invention as defined by the appended claims.

Referring to the drawings:

Fig. 2 is a section taken on the line 2—2 of Fig. 1; and

Fig. 3 is a view in perspective, illustrating the means for clamping the hub and rim of a wheel.

Figure 1:
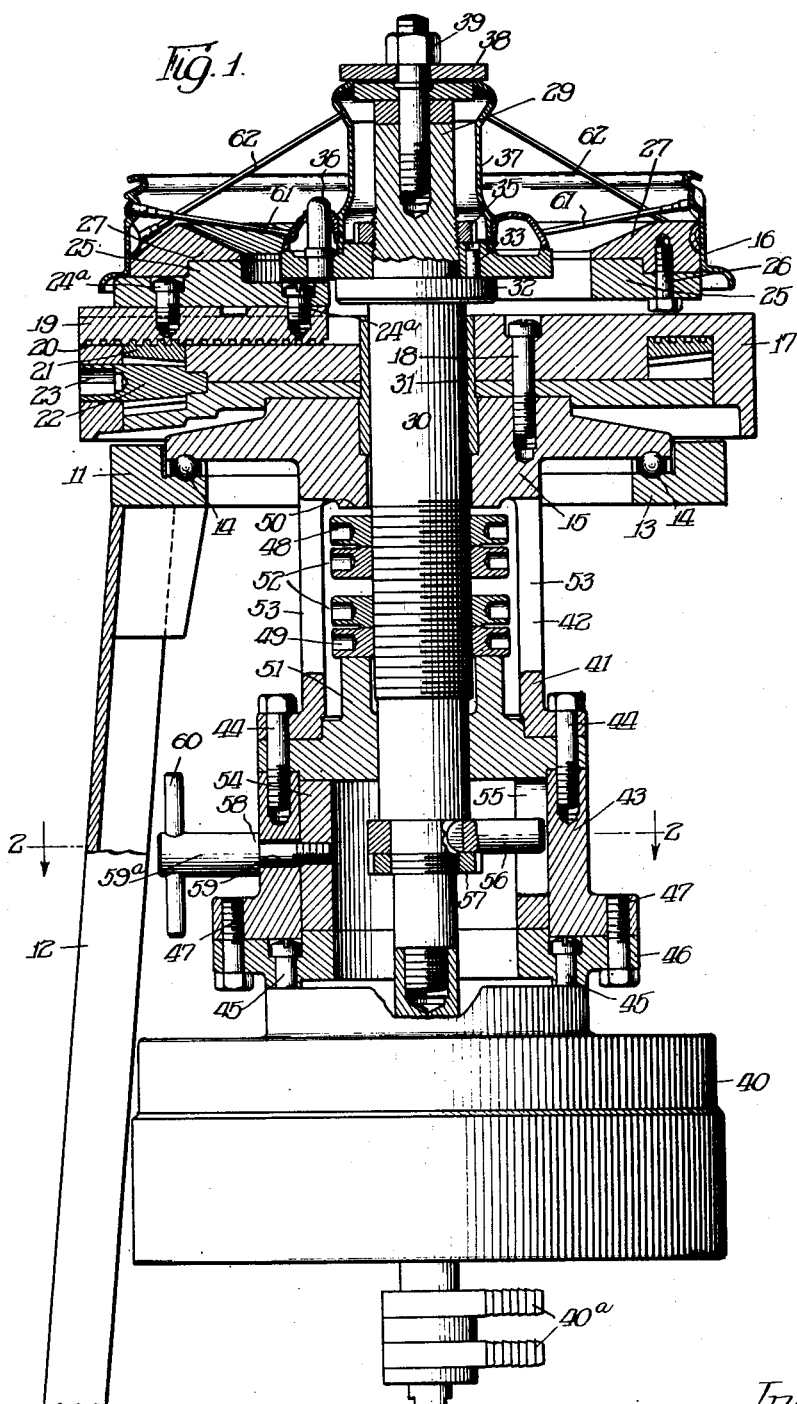
Fig. 1 is a view in cross section of a preferred form of the device.

In the drawings, the preferred embodiment of the assembling device illustrated comprises a stationary supporting member 11 supported by legs 12. The member 11 is annular in shape and is provided at its inner edge with a projection 13 in which is mounted a plurality of ball-bearings 14 upon which the balance of the structure is suspended and permitted to rotate relative to the member 11.

Mounted on the ball-bearings 14 is a circular shaped supporting member 15 to which the rim and hub clamping members and pressure device are secured. The means for clamping the rim, the latter being indicated by the numeral 16, comprises a bed member 17 which is attached to the supporting plate 15 by means of a plurality of bolts 18, only one of which is shown in the drawings. Guided for radial movement within the bed 17 are four chuck jaws 19, the under faces of which are formed as tooth racks as indicated at 20 which engage worm screws 21 in mesh with pinions 22, the latter having sockets 23 for receiving a suitable wrench 24, whereby upon rotation of the pinions the chucks are advanced or retracted in a radial direction.

Secured to the upper faces of the radially movable chucks by means of screws 24ª are four chuck jaw extensions 25 to which are attached by means of bolts 26 four sectors 27 provided at their upper outer faces with cutaway portions 28 which serve as clearance spaces for the forward group of wire spokes during the assembling operation. These sectors are interchangeable with other sector groups and are adapted for ready removal and substitution to permit use of the device for the assembling of wheels having a greater or less number of spokes.

Upon movement of the sectors 27 outwardly they engage the inner periphery of the rim of the wheel and retain the same firmly in place during the lacing operation.

The means for mounting the hub supporting member 29 constitutes a spindle 30 which is slidably mounted in the supporting member 15 and the bed 17 by means of a bushing or bearing member 31. Fixedly secured to the spindle 30 above the bed 17 is a disk 32 which has projecting therefrom a pin 33, the latter engaging a plate 34 that rests upon the disk 32. The plate 34 is held in firm engagement by means of a clamping nut 35 which is screw-threaded on the spindle 30.

Projecting from the plate 34 is a plurality of lugs 36 which fit in the bolt holes provided in the hub 37 of a wheel. The hub of the wheel is secured to the spindle 30 by means of a closure plate 38 which fits over the open end of the hub and is held in place by means of a bolt 39 screw-threaded into the upper end of the spindle 30.

Axial movement of the hub in relation to the rim is accomplished by movement of the spindle 30 up and down in relation to the bed plate 17. This movement is obtained by means of an air cylinder 40 of usual construction to which the lower end of the spindle 30 is connected. The air cylinder 40 is provided with nipples indicated at 40ª to permit the application of air under pressure to both sides of the cylinder to obtain the desired movement of the same. A fixed space relation between the air cylinder 40 and the base plate 15 is maintained by means of the housing 41 which consists of an upper housing portion 42 which is integral with and projects downwardly from the base plate 15 to the bottom of which is secured an additional housing member 43 by means of bolts 44, the bottom housing member 43 being secured to the housing of the air cylinder by means of bolts 45 which pass through a plate 46 secured to the bottom housing 43 by means of bolts 47.

In order to limit the axial movement of the spindle 30 stops 48 and 49 are screw-threaded to the spindle near the medial portion thereof, stop 48 being adapted to abut against the lower edge 50 of the supporting member 15 and stop 49 being adapted to abut against the upper edge of an annular shaped plate 51 secured in the housing 43. Lock nuts 52 are likewise screw-threaded to the spindle to abut against the stops 48 and 49 and hold the same in place. To permit adjustments of the stops 48 and 49 the housing 42 is provided with slots 53 on either side thereof so that access may be had to the stops and lock nuts.

The angularity of adjustment between the hub and the rim for different wheels is accomplished by partial rotation of the hub in relation to the rim. It is to be understood that angular adjustment is not necessary for wheels of the same type but when it is desirable to utilize the machine for the construction of various types of wheels angular adjustment is necessary. This adjustment is accomplished by rotating the spindle 30. The means for effecting such rotation comprises a sleeve 54 rotatably mounted in the lower housing 43 having a vertical slot 55 therein in which rides a pin 56, the inner end of the latter being keyed to the shaft 30 and held in place by a lock nut 57. The pin 56 is adapted to move up and down in the slot 55 and rotation of the sleeve 54 the pin 56, guided by the side walls of the slot 55, rotates the spindle 30.

Rotation of the sleeve 54 is accomplished by means of a hand set screw 58, the inner end of which is screw-threaded to the sleeve 54 and projects through a slot 59 in the lower housing 43. An enlarged portion 59ª is provided on the set screw 58 to abut against the housing 43 when the set screw is tightened by means of a handle member 60. By loosening the set screw 58 the sleeve 54 can be rotated the length of the slot 59 thereby rotating the spindle 30 to secure the proper angular relationship between the hub and the rim for lacing the spokes. When the set screw 58 is tightened the sleeve 54 and the spindle 30 are prohibited from rotation and during the run of any particular type of wheel it is not necessary to make any additional angular adjustments.

In operation of the device the wheel is assembled with the spokes loose, the rim is mounted on the bed 17 and the four sectors 27 are moved outwardly by means of the wrench 24 and the intermediate gearing arrangement to firmly hold the rim in place. The hub member 37 is secured in place by having the lugs 36 pass through the bolt holes in the lug and the end closure plate 38 is placed over the open end of the hub and retains the hub in position by means of the bolt 39 which passes through the closure plate and screw-threads into the spindle 30. Air is then applied to the chuck to raise the hub to its extreme limit and the back row of spokes, indicated by the numeral 61, is tightened by means of a power driven friction screw driver. The application of air on the piston is then reversed and forces the hub downwardly, placing the back spokes under additional tension. The front spokes, indicated by the numeral 62, are then tightened and the air is released so that the hub is permitted to assume its normal position in alignment with the rim, the excess tension on the back spokes adding tension to the front spokes.

The extent of axial movement of the hub 37 in relation to the rim 16 varies with the type of wheel but the position of the hub at the extreme limits of its movement in either direction is so adjusted by the stops 48 and 49 that after the front set of spokes has been laced and the wheel is permitted to come to its normal position it will be in practically perfect alignment.

It will readily be appreciated that the method of manufacture of wire wheels, herein disclosed, requires very little skill on the part of the workmen as the ordinary truing operations are practically eliminated, likewise that the device for accomplishing the lacing of wheels herein disclosed is simple in construction, easily manipulated and will effect economies in manufacture.

I claim:

1. A device for lacing wire wheels comprising a bed, means for fixedly securing the rim to the bed, a spindle movable coaxially in the rim, means for securing the hub of the wheel to said spindle, means for coaxial movement of said spindle and stops for limiting the movement of said spindle.

2. A device for lacing wire wheels comprising a frame, a bed member rotatably mounted on said frame, segments mounted on said bed member and means for moving said segments radially to engage the rim of a wheel, a spindle coaxially mounted in relation to the rim on said bed member, means for securing the hub to said spindle, means for applying pressure to move the same axially and means for limiting the movement of said spindle.

3. A device for lacing wire wheels comprising a bed member rotatably mounted on a frame, means for securing the rim of a wheel to said bed member, a housing mounted on said bed member, a spindle slidably mounted in said housing and coaxially in relation to said rim, means for applying pressure to said spindle to cause axial movement thereof, adjustable stops positioned on said spindle, means for said stops to abut against and limit the movement of said spindle.

4. A device for lacing wire wheels comprising a bed member, means for securing a rim to said bed member, a spindle coaxially mounted in relation to said rim, means for securing a hub to said spindle and means for adjusting the angularity of said hub comprising a pin projecting from said spindle, a rotatable member having an elongated slot therein in alignment with said spindle and adapted to receive said pin and means for fixing the position of said rotatable member.

5. A device for lacing wire wheels comprising a frame, a bed member rotatably mounted on said frame, means for securing a rim to said bed member, a housing associated with said bed member and a spindle mounted in said housing coaxially in relation to said rim, means for securing the hub to said spindle, means for applying pressure to said spindle to cause axial movement thereof, a sleeve rotatably mounted in said housing around said spindle and having an elongated slot therein in alignment with said spindle, a pin fixedly secured to said spindle and having one end thereof projecting into said slot, a set screw engaging said sleeve and projecting through said housing to fix the position of said sleeve in relation to said housing.

6. A device for lacing wire wheels comprising a frame, a bed member rotatably mounted on said frame, sectors mounted on the upper portion of said bed member, means for effecting a radial movement of said sectors to engage the rim of a wheel, a housing projecting downwardly from said bed member, a spindle mounted in said housing in coaxial alignment with said rim, means for securing a hub to said spindle, a pressure device for effecting axial movement of said hub and spindle relative to said rim, stops adjustably secured to said spindle, abutments for engaging said stops to limit the movement of the spindle, a sleeve rotatably mounted in said housing and having an elongated slot therein in alignment with said spindle, a pin fixedly secured to said spindle and projecting therefrom to ride in said slots, a set screw threaded into said sleeve and projecting through a slot in said housing, said last mentioned slot being so shaped as to permit rotation of said spindle and to engage said set screw when the same is tightened.

In testimony whereof I have hereunto subscribed my name.

MOSES W. H. WILSON.